(12) United States Patent
Sanada

(10) Patent No.: US 8,961,683 B2
(45) Date of Patent: Feb. 24, 2015

(54) INFRARED REFLECTING BLUE PIGMENT, INFRARED REFLECTING GREEN PIGMENT, PAINT AND RESIN COMPOSITION USING THE INFRARED REFLECTING BLUE PIGMENT, AND PAINT AND RESIN COMPOSITION USING THE INFRARED REFLECTING GREEN PIGMENT

(75) Inventor: Kazutoshi Sanada, Otake (JP)

(73) Assignee: Toda Kogyo Corporation, Otake (JP)

( * ) Notice: Subject to any disclaimer, the term of this patent is extended or adjusted under 35 U.S.C. 154(b) by 545 days.

(21) Appl. No.: 12/396,573

(22) Filed: Mar. 3, 2009

(65) Prior Publication Data
US 2009/0223414 A1 Sep. 10, 2009

(30) Foreign Application Priority Data

Mar. 7, 2008 (JP) ................................. 2008-058775
Mar. 7, 2008 (JP) ................................. 2008-058776

(51) Int. Cl.
| | |
|---|---|
| *C09C 1/22* | (2006.01) |
| *C09C 1/40* | (2006.01) |
| *B82Y 30/00* | (2011.01) |
| *C01G 49/00* | (2006.01) |
| *C01G 51/00* | (2006.01) |
| *C09D 5/33* | (2006.01) |
| *C09D 7/12* | (2006.01) |
| *C08K 3/22* | (2006.01) |
| *C08K 9/02* | (2006.01) |

(52) U.S. Cl.
CPC . *C09C 1/40* (2013.01); *B82Y 30/00* (2013.01); *C01G 49/009* (2013.01); *C01G 51/006* (2013.01); *C09D 5/004* (2013.01); *C09D 7/1225* (2013.01); *C09D 7/1266* (2013.01); *C09D 7/1275* (2013.01); *C09D 7/1283* (2013.01); *C01P 2002/32* (2013.01); *C01P 2002/54* (2013.01); *C01P 2004/61* (2013.01); *C01P 2004/62* (2013.01); *C01P 2004/64* (2013.01); *C01P 2006/12* (2013.01); *C01P 2006/62* (2013.01); *C01P 2006/63* (2013.01); *C01P 2006/64* (2013.01); *C08K 3/22* (2013.01); *C08K 9/02* (2013.01)
USPC ........................................... 106/456; 106/459

(58) Field of Classification Search
USPC .................................................. 106/456, 459
See application file for complete search history.

(56) References Cited

U.S. PATENT DOCUMENTS

| | | | | |
|---|---|---|---|---|
| 5,194,089 | A  * | 3/1993 | Speer et al. .................... | 106/426 |
| 6,436,543 | B1 * | 8/2002 | Endo et al. ..................... | 428/447 |
| 6,730,727 | B2 * | 5/2004 | Oshima et al. ................. | 524/430 |
| 6,861,261 | B2 * | 3/2005 | Watson et al. .................. | 436/84 |

FOREIGN PATENT DOCUMENTS

| | | |
|---|---|---|
| EP | 1 847 512 A | 10/2007 |
| JP | 05-051576 | 3/1993 |
| JP | 2002-129157 | 5/2002 |

OTHER PUBLICATIONS

Koroleva, "Synthesis of Spinel-Based Ceramic Pigments from Hydroxycarbonates", Glass and Ceramics, Springer, NY, vol. 61, No. 9/10, Sep. 1, 2004; XP001221270.
Govindaraj et al, "An Investigation of Carbon Nanotubes Obtained from the Decomposition of Methane Over Reduced Mgl-xMxA1204 Spinel Catalysts", J. Materials Research, vol. 14, No. 6, Jun. 1999 pp. 2567-2575; XP002533404.
English translation of JP Office Action in JP 2008-058775 mailed Nov. 1, 2012.
English translation of JP Office Action in JP 2008-058776 mailed May 2, 2012.
Coquay et al, "Fe/Co Alloys for the Catalytic Chemical Vapor . . . ", J. Phys. Chem. 2005, 109, 17325-17830.
English translation of JP Office Action in JP 2008-058776 mailed Oct. 24, 2012.

* cited by examiner

*Primary Examiner* — Shuangyi Abu Ali
(74) *Attorney, Agent, or Firm* — Nixon & Vanderhye P.C.

(57) ABSTRACT

The present invention relates to an infrared reflecting blue pigment comprising a composite oxide comprising Co, Al and mg, wherein a content of Mg in the blue pigment is 11 to 22% in terms of a molar ratio thereof based on whole metal element present in the blue pigment, and the blue pigment has a BET specific surface area of 10 to 100 m$^2$/g; and an infrared reflecting green pigment comprising a composite oxide comprising Co, Al, Mg and Fe, wherein a content of Mg in the green pigment is 11 to 22% in terms of a molar ratio thereof based on whole metal element present in the green pigment, a content of Fe in the green pigment is 0.5 to 20% in terms of a molar ratio thereof based on whole metal element present in the green pigment, and the green pigment has an average particle diameter of 0.02 to 1.2 μm.

8 Claims, No Drawings

INFRARED REFLECTING BLUE PIGMENT, INFRARED REFLECTING GREEN PIGMENT, PAINT AND RESIN COMPOSITION USING THE INFRARED REFLECTING BLUE PIGMENT, AND PAINT AND RESIN COMPOSITION USING THE INFRARED REFLECTING GREEN PIGMENT

BACKGROUND OF THE INVENTION

The present invention relates to an infrared reflecting blue pigment and an infrared reflecting green pigment which comprise no harmful elements, and are capable of providing a heat-shielding paint exhibiting an excellent infrared reflecting property.

In roads, buildings, storage tanks, automobiles, ships, etc., which are used or located out of doors, an inside temperature thereof is increased when exposed to solar radiation. For this reason, an outside surface of buildings, automobiles, etc., has been painted with a white to light color to reflect sunlight thereon, thereby enhancing a heat-shielding effect to some extent.

However, in particular, roofs of buildings exposed to outside are frequently painted with a deep to black color to make stains or contamination thereon unremarkable. Buildings, automobiles, etc., whose outside surface is painted with a deep to black color, tend to absorb sunlight as compared to those having an outside surface painted with a light to white color, and tend to suffer from considerable increase in inside temperature when exposed to solar radiation. Such a high inside temperature of buildings, automobiles, etc., is undesirable for transportation or storage of products.

From the standpoint of saving energies for preventing global warming problems, it has been strongly demanded to suppress the increase in inside temperature of buildings, automobiles, etc., whose outside surface has deep color to black color. For example, there have been conventionally developed heat-shielding black paints comprising a black calcined pigment having a spinel structure which comprises CoO, $Cr_2O_3$ and $Fe_2O_3$ (refer to Japanese Patent Application Laid-Open (KOKAI) No. 2000-72990). However, the black calcined pigment comprises harmful Cr. In consequence, it has been demanded to provide an infrared reflecting black pigment comprising no harmful elements which are capable of exhibiting an excellent infrared reflecting property. The present inventors have developed such an infrared reflecting black pigment comprising no harmful elements which are capable of exhibiting an excellent infrared reflecting property, and already filed a patent application relating thereto (refer to Japanese Patent Application Laid-Open (KOKAI) No. 2007-197570).

As is well known, in addition to these black paints, many other coloring paints such as blue, green and red paints have been employed. As the conventional blue inorganic pigments for paints, etc., there have been extensively used cobalt blue-based pigments. With respect to such cobalt blue-based pigments, many proposals have been made to provide various improved blue pigments. For example, there has been proposed the method of producing a cobalt blue-based pigment in the form of reddish fine particles in which hydroxides or carbonates of aluminum and cobalt are precipitated using sodium carbonate as an alkali agent in the co-existence of a phosphorus compound (refer to Japanese Patent Application Laid-Open (KOKAI) No. 2000-80301). Further, there has been proposed the method of producing a cobalt blue-based pigment having a high transparency in which a sufficient energy capable of exhibiting a mechanochemical effect is applied to starting materials upon pulverization and mixing thereof to obtain secondary particles in which cobalt and aluminum are present in a uniformly dispersed state, and then the secondary particles are heated and calcined (refer to Japanese Patent Application Laid-Open (KOKAI) No. 10-219132 (1998)).

In addition, as the green inorganic pigments for paints, etc., there are well known those pigments in the form of a spinel-type composite oxide comprising cobalt, aluminum, chromium and titanium. However, it is also desired that the green pigments comprise no harmful chromium therein. As the chromium-free green pigments, there have been proposed green pigments in the form of a composite oxide comprising oxides of cobalt, aluminum and titanium (refer to Japanese Patent Application Laid-Open (KOKAI) No. 2000-86246).

SUMMARY OF THE INVENTION

At present, from the standpoint of preventing global warming problems, etc., there is a demand for blue paints and green paints having an excellent infrared reflecting property similarly to the black paints. With respect to blue pigments usable for the blue paints, there are known not only the production methods and blue pigments produced thereby as described in the above Japanese Patent Application Laid-Open (KOKAI) No. 2000-80301 and Japanese Patent Application Laid-Open (KOKAI) No. 10-219132 (1998), but also many other production methods and blue pigments as described in various laid-opened patent applications. However, infrared reflecting blue pigments comprising no harmful elements and exhibiting an excellent infrared reflecting property have not been obtained until now. Also, with respect to green pigments usable for the green paints, there are known not only the production method and green pigment produced thereby as described in the above Japanese Patent Application Laid-Open (KOKAI) No. 2000-86246, but also many other production methods and green pigments as described in various laid-opened patent applications. However, infrared reflecting green pigments comprising no harmful elements and exhibiting an excellent infrared reflecting property have not been obtained until now.

A first object of the present invention is to provide an infrared reflecting blue pigment comprising no harmful elements and exhibiting an excellent infrared reflecting property.

A second object of the present invention is to provide an infrared reflecting green pigment comprising no harmful elements and exhibiting an excellent infrared reflecting property.

The first object of the present invention can be achieved by the following aspects of the present invention.

That is, in a first invention, there is provided an infrared reflecting blue pigment comprising a composite oxide comprising Co, Al and Mg, wherein a content of Mg in the blue pigment is 11 to 22% in terms of a molar ratio thereof based on whole metal element present in the blue pigment, and the blue pigment has a BET specific surface area of 10 to 100 $m^2/g$ (Invention 1).

In a second invention, there is provided an infrared reflecting blue pigment according to Invention 1, wherein the infrared reflecting blue pigment has a spinel-type crystal structure (Invention 2).

In a third invention, there is provided an infrared reflecting blue pigment according to Invention 1, wherein the infrared reflecting blue pigment has a lightness (L*) of 35 to 50 (Invention 3).

In a fourth invention, there is provided an infrared reflecting blue pigment according to Invention 1, wherein the infrared reflecting blue pigment has a solar radiation reflectance of 45 to 60% (Invention 4).

In a fifth invention, there is provided an infrared reflecting blue pigment according to Invention 1, wherein a surface of the infrared reflecting blue pigment is coated with a compound of at least one element selected from the group consisting of Si, Al, Zr and Ti (Invention 5).

In a sixth invention, there is provided a paint comprising the infrared reflecting blue pigment as defined in Invention 1, and a paint base material in which the pigment is blended (Invention 6).

In a seventh invention, there is provided a resin composition comprising the infrared reflecting blue pigment as defined in Invention 1 with which the composition is tinted (Invention 7).

The second object of the present invention can be achieved by the following aspects of the present invention.

In an eighth invention, there is provided an infrared reflecting green pigment comprising a composite oxide comprising Co, Al, Mg and Fe, wherein a content of Mg in the green pigment is 11 to 22% in terms of a molar ratio thereof based on whole metal element present in the green pigment, a content of Fe in the green pigment is 0.5 to 20% in terms of a molar ratio thereof based on whole metal element present in the green pigment, and the green pigment has an average particle diameter of 0.02 to 1.2 µm (Invention 8).

In a ninth invention, there is provided an infrared reflecting green pigment according to Invention 8, wherein the infrared reflecting green pigment has a spinel-type crystal structure (Invention 9).

In a tenth invention, there is provided an infrared reflecting green pigment according to Invention 8, wherein the infrared reflecting green pigment has a lightness (L*) of more than 30 and not more than 40 (Invention 10).

In an eleventh invention, there is provided an infrared reflecting green pigment according to Invention 8, wherein the infrared reflecting green pigment has a solar radiation reflectance of 35 to 50% (Invention 11).

In a twelfth invention, there is provided an infrared reflecting green pigment according to Invention 8, wherein a surface of the infrared reflecting green pigment is coated with a compound of at least one element selected from the group consisting of Si, Al, Zr and Ti (Invention 12).

In an thirteenth invention, there is provided a paint comprising the infrared reflecting green pigment as defined in Invention 8, and a paint base material in which the pigment is blended (Invention 13).

In an fourteenth invention, there is provided a resin composition comprising the infrared reflecting green pigment as defined in Invention 8 with which the composition is tinted (Invention 14).

DETAILED DESCRIPTION OF THE INVENTION

The present invention is described in detail below.

First, the infrared reflecting blue pigment capable of achieving the first object of the present invention is described.

The infrared reflecting blue pigment according to the present invention is a blue pigment which comprises a composite oxide comprising Co, Al and Mg, wherein the content of Mg in the blue pigment is 11 to 22% in terms of a molar ratio based on whole metal elements present in the blue pigment, and the blue pigment has a BET specific surface area of 10 to 100 m²/g.

The content of Mg in the infrared reflecting blue pigment of the present invention is 11 to 22 mol %, preferably 12 to 20 mol % and still more preferably 13 to 20 mol % based on whole metal elements present in the blue pigment. When the content of Mg in the infrared reflecting blue pigment is less than 11 mol % based on the whole metal elements, the resulting pigment may fail to exhibit a sufficient solar radiation reflectance. On the other hand, when the content of Mg in the infrared reflecting blue pigment is more than 22 mol % based on the whole metal elements, the resulting pigment tends to exhibit an excessively large lightness (L*). The content of Co in the infrared reflecting blue pigment of the present invention is preferably 12 to 22 mol % based on whole metal elements present in the blue pigment. The content of impurities derived from various raw materials which may be inevitably mixed in the infrared reflecting blue pigment of the present invention is very small. Therefore, the metal element other than Mg and Co which may be present in the infrared reflecting blue pigment of the present invention is substantially Al solely. The ratio of a total content of Co and Mg to a content of Al in the infrared reflecting blue pigment of the present invention is preferably 1:2 in terms of a molar ratio therebetween.

The infrared reflecting blue pigment of the present invention has a BET specific surface area of 10 to 100 m²/g, preferably 15 to 90 m²/g, more preferably 20 to 80 m²/g and still more preferably 36 to 80 m²/g. When the BET specific surface area of the infrared reflecting blue pigment is less than 10 m²/g, the resultant pigment particles tend to become coarse, or sintering tends to be caused within or between the particles, resulting in poor tinting strength thereof. When the BET specific surface area of the infrared reflecting blue pigment is more than 100 m²/g, the pigment particles tend to be agglomerated together owing to fineness thereof, and it may be difficult to uniformly disperse the resultant pigment in a vehicle.

The infrared reflecting blue pigment of the present invention preferably has a spinel-type crystal structure.

The infrared reflecting blue pigment of the present invention may inevitably comprise impurities derived from various raw materials. Even in such a case, for example, the Cr content in the infrared reflecting blue pigment is not more than 1% by weight, in particular, the content of $Cr^{6+}$ is not more than 10 ppm.

The average particle diameter of the infrared reflecting blue pigment of the present invention is preferably 0.02 to 1.2 µm. When the average particle diameter of the infrared reflecting blue pigment is more than 1.2 µm, the particle size of the resultant pigment tends to be too large, resulting in poor tinting strength thereof. When the average particle diameter of the infrared reflecting blue pigment is less than 0.02 µm, it may be difficult to uniformly disperse the resultant pigment in a vehicle. The average particle diameter of the infrared reflecting blue pigment of the present invention is more preferably 0.02 to 1.1 µm and still more preferably 0.02 to 1.0 µm.

The lightness (L*) of the infrared reflecting blue pigment of the present invention is preferably 35 to 50. When the lightness (L*) of the infrared reflecting blue pigment is out of the above specified range, the resulting pigment may fail to exhibit an excellent blue color, resulting in limited applications thereof. The lightness (L*) of the infrared reflecting blue pigment of the present invention is more preferably 40 to 50.

The a* value of the infrared reflecting blue pigment of the present invention is preferably 15 to 30. When the a* value of the infrared reflecting blue pigment is out of the above specified range, the resulting pigment may fail to exhibit an excellent blue color, resulting in limited applications thereof. The a* value of the infrared reflecting blue pigment of the present invention is more preferably 17 to 28.

The b* value of the infrared reflecting blue pigment of the present invention is preferably −40 to −60. When the b* value of the infrared reflecting blue pigment is out of the above specified range, the resulting pigment may fail to exhibit an excellent blue color, resulting in limited applications thereof. The b* value of the infrared reflecting blue pigment of the present invention is more preferably −45 to −60.

The solar radiation reflectance of the infrared reflecting blue pigment of the present invention is preferably 45 to 60%. When the solar radiation reflectance of the infrared reflecting blue pigment is less than 45%, the resulting pigment may fail to exhibit a sufficient infrared reflecting property. The solar radiation reflectance of the infrared reflecting blue pigment of the present invention is more preferably 50 to 60%.

In the present invention, the surface of the respective particles of the infrared reflecting blue pigment of the present invention may be coated with a compound of at least one element selected from the group consisting of Si, Al, Zr and Ti. The coating amount of the compound is preferably 0.1 to 10% by weight and more preferably 0.2 to 5% by weight based on the weight of the infrared reflecting blue pigment.

Next, the infrared reflecting green pigment capable of achieving the second object of the present invention is described.

The infrared reflecting green pigment according to the present invention is a green pigment which comprises a composite oxide comprising Co, Al, Mg and Fe in which the content of Mg in the green pigment is 11 to 22% in terms of a molar ratio based on whole metal elements present in the green pigment, and the content of Fe in the green pigment is 0.5 to 20% in terms of a molar ratio based on whole metal elements present in the green pigment. The average particle diameter of the infrared reflecting green pigment according to the present invention is 0.02 to 1.2 µm.

The content of Mg in the infrared reflecting green pigment of the present invention is 11 to 22 mol % based on whole metal elements present in the green pigment, and the content of Fe in the infrared reflecting green pigment of the present invention is 0.5 to 20 mol % based on the whole metal elements. When the content of Mg and Fe in the infrared reflecting green pigment are respectively out of the above specified ranges, the resulting pigment may fail to exhibit a sufficient hue and/or solar radiation reflectance, so that it may be difficult to obtain a green pigment having an excellent hue and an excellent solar radiation reflectance. The content of Mg in the infrared reflecting green pigment of the present invention is preferably 12 to 20 mol % and more preferably 13 to 20 mol % based on whole metal elements. The content of Fe in the infrared reflecting green pigment of the present invention is preferably 0.6 to 15 mol % and more preferably 2 to 12 mol % based on whole metal elements present in the green pigment. The content of Co in the infrared reflecting green pigment of the present invention is preferably 12 to 22 mol % based on whole metal elements present in the green pigment. The content of impurities derived from various raw materials which may be inevitably mixed in the infrared reflecting green pigment of the present invention is very small. Therefore, the metal element other than Mg, Fe and Co which may be present in the infrared reflecting green pigment of the present invention is substantially Al solely. The ratio of a total content of Co and Mg to a total content of Fe and Al in the infrared reflecting green pigment of the present invention is preferably 1:2 in terms of a molar ratio therebetween.

The average particle diameter of the infrared reflecting green pigment of the present invention is 0.02 to 1.2 µm. When the average particle diameter of the infrared reflecting green pigment is more than 1.2 µm, the particle size of the resultant pigment tends to be too large, resulting in poor tinting strength thereof. When the average particle diameter of the infrared reflecting green pigment is less than 0.02 µm, it may be difficult to uniformly disperse the resultant pigment in a vehicle. The average particle diameter of the infrared reflecting green pigment of the present invention is preferably 0.02 to 1.1 µm and more preferably 0.02 to 1.0 µm.

The infrared reflecting green pigment of the present invention preferably has a spinel-type crystal structure.

The infrared reflecting green pigment of the present invention may inevitably comprise impurities derived from various raw materials. Even in such a case, for example, the Cr content in the infrared reflecting green pigment is not more than 1% by weight, in particular, the content of $Cr^{6+}$ is not more than 10 ppm.

The infrared reflecting green pigment of the present invention preferably has a BET specific surface area of 5 to 100 $m^2/g$ and more preferably 8 to 90 $m^2/g$. When the BET specific surface area of infrared reflecting green pigment is less than 5 $m^2/g$, the resultant pigment particles tend to become coarse, or sintering tends to be caused within or between the particles, resulting in poor tinting strength thereof.

The lightness (L*) of the infrared reflecting green pigment of the present invention is preferably more than 30 and not more than 40. When the lightness (L*) of the infrared reflecting green pigment is out of the above specified range, the resulting pigment may fail to exhibit an excellent green color, resulting in limited applications thereof. The lightness (L*) of the infrared reflecting green pigment of the present invention is more preferably 32 to 40.

The a* value of the infrared reflecting green pigment of the present invention is preferably −2 to 0. When the a* value of the infrared reflecting green pigment is out of the above specified range, the resulting pigment may fail to exhibit an excellent green color, resulting in limited applications thereof. The a* value of the infrared reflecting green pigment of the present invention is more preferably −1.5 to −0.2.

The b* value of the infrared reflecting green pigment of the present invention is preferably −5 to −15. When the b* value of the infrared reflecting green pigment is out of the above specified range, the resulting pigment may fail to exhibit an excellent green color, resulting in limited applications thereof. The b* value of the infrared reflecting green pigment of the present invention is more preferably −7 to −12.

The solar radiation reflectance of the infrared reflecting green pigment of the present invention is preferably 35 to 50%. When the solar radiation reflectance of the infrared reflecting blue pigment is less than 35%, the resulting pigment may fail to exhibit a sufficient infrared reflecting property. The solar radiation reflectance of the infrared reflecting green pigment of the present invention is more preferably 37 to 48%.

In the present invention, the surface of the respective particles of the infrared reflecting green pigment of the present invention may be coated with a compound of at least one element selected from the group consisting of Si, Al, Zr and Ti. The coating amount of the compound is preferably 0.1 to 10% by weight and more preferably 0.2 to 5% by weight based on the weight of the infrared reflecting green pigment.

Next, the process for producing the infrared reflecting blue pigment and the infrared reflecting green pigment according to the present invention is described.

The infrared reflecting blue pigment and the infrared reflecting green pigment according to the present invention may be produced by mixing various raw materials with each other and then calcining the resultant mixture.

As the starting materials, there may be used oxides, carbonates, nitrates and sulfates of various metal elements described above.

The method of mixing the starting materials is not particularly limited as long as these materials can be uniformly mixed with each other, and either a wet-mixing method or a dry-mixing method may be used in the present invention. There may also be used a wet-synthesis method.

Upon production of the infrared reflecting blue pigment, the heat-calcining temperature is preferably 800 to 1200° C. and more preferably 800 to 1050° C., and the heating atmosphere may be an atmospheric air.

Upon production of the infrared reflecting green pigment, the heat-calcining temperature is preferably 800 to 1200° C. and more preferably 800 to 1150° C., and the heating atmosphere may be an atmospheric air.

The particles obtained after heating may be washed with water and then pulverized by ordinary methods.

In the present invention, the surface of the particles of the infrared reflecting blue pigment or the infrared reflecting green pigment may be coated with a compound of at least one element selected from the group consisting of Si, Al, Zr and Ti. The surface coating treatment may be conducted by an ordinary method such as a wet method and a dry method. In the wet coating method, for example, a soluble compound of at least one element selected from the group consisting of Si, Al, Zr and Ti may be added to and mixed in a wet-dispersed slurry of the infrared reflecting blue pigment or the infrared reflecting green pigment while controlling the pH value of the slurry with an acid or an alkali to coat the pigment particles with the soluble compound. In the dry coating method, the infrared reflecting blue pigment or the infrared reflecting green pigment may be coated with a coupling agent comprising at least one element selected from the group consisting of Si, Al, Zr and Ti in a suitable apparatus such as a Henschel mixer.

Next, the paint comprising the infrared reflecting blue pigment or the infrared reflecting green pigment according to the present invention is described.

The amount of the infrared reflecting blue pigment or the infrared reflecting green pigment blended in the paint of the present invention is 0.5 to 100 parts by weight on the basis of 100 parts by weight of a paint base material. From the viewpoint of a good handling property of the obtained paint, the amount of the infrared reflecting blue pigment or the infrared reflecting green pigment blended in the paint is preferably 1.0 to 100 parts by weight.

The paint base material may comprise a resin, a solvent and, if required, an optional component such as fats and oils, a defoaming agent, an extender pigment, a drying accelerator, a surfactant, a curing accelerator and an assistant.

As the resin, there may be used various resins ordinarily used for solvent-based paints or oil-based printing inks. Specific examples of the resin may include acrylic resins, alkyd resins, polyester resins, polyurethane resins, epoxy resins, phenol resins, melamine resins, amino resins, vinyl chloride resins, silicone resins, rosin-based resins such as gum rosins and lime rosins, maleic acid resins, polyamide resins, nitrocellulose, ethylene-vinyl acetate copolymer resins, rosin-modified resins such as rosin-modified phenol resins and rosin-modified maleic acid resins, and petroleum resins. In particular, as the resins for water-based paints, there may be used those resins ordinarily used for water-based paints or water-based inks. Specific examples of the resins for water-based paints may include water-soluble acrylic resins, water-soluble styrene-maleic acid resins, water-soluble alkyd resins, water-soluble melamine resins, water-soluble urethane emulsion resins, water-soluble epoxy resins, water-soluble polyester resins, etc.

As the solvent, there may be used those solvents ordinarily used for solvent-based paints. Specific examples of the solvent may include soybean oil, toluene, xylene, a thinner, butyl acetate, methyl acetate, methyl isobutyl ketone, methyl cellosolve, ethyl cellosolve, propyl cellosolve, butyl cellosolve, glycol ether-based solvents such as propylene glycol monomethyl ether, ester-based solvents such as ethyl acetate, butyl acetate and amyl acetate, aliphatic hydrocarbon-based solvents such as hexane, heptane and octane, alicyclic hydrocarbon-based solvents such as cyclohexane, petroleum-based solvents such as mineral spirits, ketone-based solvents such as acetone and methyl ethyl ketone, alcohol-based solvents such as methyl alcohol, ethyl alcohol, propyl alcohol and butyl alcohol, and aliphatic hydrocarbons.

As the solvents for water-based paints, there may be used mixtures of water with water-soluble organic solvents ordinarily used for water-based paints. Examples of the water-soluble organic solvents may include alcohol-based solvents such as ethyl alcohol, propyl alcohol and butyl alcohol, glycol ether-based solvents such as methyl cellosolve, ethyl cellosolve, propyl cellosolve and butyl cellosolve, oxyethylene or oxypropylene addition polymers such as diethylene glycol, triethylene glycol, polyethylene glycol, dipropylene glycol, tripropylene glycol and polypropylene glycol, alkylene glycols such as ethylene glycol, propylene glycol and 1,2,6-hexanetriol, glycerol and 2-pyrrolidone.

Examples of the fats and oils may include boiled oils obtained by processing dry oils such as linseed oil, tung oil, oiticica oil and safflower oil.

Examples of the defoaming agent may include commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" all produced by Sun Nopco Co., Ltd., and "ANTI-FOAM 08 (tradename)" and "EMULGEN 903 (tradename)" both produced by Kao Corp.

Next, the resin composition comprising the infrared reflecting blue pigment or the infrared reflecting green pigment according to the present invention is described.

The amount of the infrared reflecting blue pigment or the infrared reflecting green pigment blended in the resin composition of the present invention is 0.01 to 200 parts by weight on the basis of 100 parts by weight of the resin. In particular, from the viewpoint of a good handling property of the obtained resin composition, the amount of the infrared reflecting blue pigment or the infrared reflecting green pigment blended therein is preferably 0.05 to 150 parts by weight and more preferably 0.1 to 100 parts by weight.

The base material for the resin composition of the present invention comprises the infrared reflecting blue pigment or the infrared reflecting green pigment and a known thermoplastic resin, and may optionally comprise various additives such as lubricants, plasticizers, antioxidants, ultraviolet absorbers and various stabilizers, if required.

Examples of the resin used in the resin composition include polyolefins such as polyethylene, polypropylene, polybutene and polyisobutylene; thermoplastic resins such as polyvinyl chloride, polymethyl pentene, polyethylene terephthalate, polybutylene terephthalate, polystyrene, styrene-acrylate copolymers, styrene-vinyl acetate copolymers, acrylonitrile-butadiene-styrene copolymers, acrylonitrile-EPDM-styrene copolymers, acrylic resins, polyamides, polycarbonates, polyacetals and polyurethanes; rosin-modified maleic acid resins; phenol resins; epoxy resins; polyester resins; silicone resins; rosin esters; rosins; natural rubbers; and synthetic rubbers.

The amount of the additives added may be not more than 50% by weight on the basis of the total weight of the infrared reflecting blue pigment or the infrared reflecting green pigment and the resin. When the content of the additives in the resin composition is more than 50% by weight, the obtained resin composition tends to be deteriorated in moldability.

The resin composition of the present invention may be produced by previously intimately mixing the raw resin material with the infrared reflecting blue pigment or the infrared reflecting green pigment, and then applying a strong shear force to the resultant mixture under heating by using a kneader or an extruder to break and deaggregate agglomerated particles of the infrared reflecting blue pigment or the infrared reflecting green pigment and uniformly disperse the infrared reflecting blue pigment or the infrared reflecting green pigment in the resin material. Then, the resultant resin composition may be molded into a desired shape according to the objects and requirements upon use.

Also, the resin composition of the present invention may be obtained via master batch pellets.

The master batch pellets used in the present invention may be produced by mixing a binder resin as the paint base material or the resin composition base material with the infrared reflecting blue pigment or the infrared reflecting green pigment, if required, by using a mixing apparatus such as a ribbon blender, a Nauter mixer, a Henschel mixer and a super mixer, and then kneading and molding the resultant mixture by using a known single-screw or twin-screw kneading extruder, etc., followed by cutting the resultant molded material, or may be produced by kneading the above mixture by using a Banbury mixer, a pressing kneader, etc., and then subjecting the resultant kneaded material to pulverization or molding, and cutting.

Upon feeding the binder resin and the infrared reflecting blue pigment or the infrared reflecting green pigment to the kneader, these materials may be respectively fed thereto at predetermined ratios, or a mixture of both the materials may be fed thereto.

The average major axis diameter of the master batch pellets used in the present invention is 1 to 6 mm and preferably 2 to 5 mm, whereas the average minor axis diameter thereof is 2 to 5 mm and preferably 2.5 to 4 mm. When the average major axis diameter of the master batch pellets is less than 1 mm, the workability upon production of the pellets tends to be deteriorated. When the average major axis diameter of the master batch pellets is more than 6 mm, the difference in size between the master batch pellets and diluting binder resin pellets tends to be considerably large, so that it may be difficult to sufficiently disperse the pellets in the diluting binder resin. The master batch pellets may have various shapes such as, for example, an amorphous shape, a granular shape such as a spherical shape, a cylindrical shape, a flake-like shape, etc.

The binder resin used for production of the master batch pellets in the present invention may be the same as the resin used in the resin composition.

Meanwhile, the composition of the binder resin used in the master batch pellets may be the same as or different from that of the diluting binder resin. When using the resin having a different composition from that of the diluting binder resin, the resins to be used may be determined in the consideration of various properties so as to attain a good compatibility between these resins.

The amount of the infrared reflecting blue pigment or the infrared reflecting green pigment blended in the master batch pellets is 1 to 200 parts by weight, preferably 1 to 150 parts by weight and more preferably 1 to 100 parts by weight on the basis of 100 parts by weight of the binder resin. When the amount of the infrared reflecting blue pigment or the infrared reflecting green pigment blended in the master batch pellets is less than 1 part by weight, the melt viscosity upon kneading tends to be insufficient, so that it may be difficult to suitably disperse and mix the infrared reflecting blue pigment or the infrared reflecting green pigment in the resin composition. When the amount of the infrared reflecting blue pigment or the infrared reflecting green pigment blended in the master batch pellets is more than 200 part by weight, the amount of the binder resin tends to be comparatively smaller than that of the infrared reflecting blue pigment or the infrared reflecting green pigment, so that it may be difficult to suitably disperse and mix the infrared reflecting blue pigment or the infrared reflecting green pigment in the resin composition. Further, a slight change in amount of the master batch pellets added tends to cause a considerable change in content of the infrared reflecting blue pigment or the infrared reflecting green pigment in the resin composition, so that it may be difficult to attain a desired content of the infrared reflecting blue pigment or the infrared reflecting green pigment in the resin composition, or severe mechanical abrasion tends to be caused.

<Function>

The important point of the present invention resides in that the infrared reflecting blue pigment or the infrared reflecting green pigment of the present invention comprises no harmful elements and exhibits a high infrared reflecting property.

The reason why the infrared reflecting blue pigment of the present invention can exhibit an excellent blue color and a high infrared reflecting property, is considered by the present inventors as follows, though it is not clearly determined. That is, as is apparent from the below-mentioned Examples and Comparative Examples, it is considered that by incorporating Mg together with Co and Al in the blue pigment such that the content of Mg is 11 to 22% in terms of a molar ratio based on whole metal elements present in the blue pigment, and controlling a BET specific surface of the blue pigment to 10 to 100 m$^2$/g, the resulting pigment can exhibit an excellent blue color and can be enhanced in solar radiation reflectance.

The reason why the infrared reflecting green pigment of the present invention can exhibit an excellent green color and a high infrared reflecting property, is considered by the present inventors as follows, though it is not clearly determined. That is, as is apparent from the below-mentioned Examples and Comparative Examples, it is considered that by incorporating Co, Al, Mg and Fe in the green pigment such that the contents of Mg and Fe in the green pigment are 11 to 22% and 0.5 to 20%, respectively, in terms of a molar ratio based on whole metal elements present in the green pigment, and controlling an average particle diameter of the green pigment to 0.02 to 1.2 μm the resulting pigment can exhibit an excellent green color and can be enhanced in solar radiation reflectance.

Also, the infrared reflecting blue pigment and the infrared reflecting green pigment of the present invention comprise no harmful metal elements such as $Cr^{6+}$ and, therefore, can provide a safe pigment.

The infrared reflecting blue pigment and the infrared reflecting green pigment of the present invention are in the form of a blue pigment and a green pigment, respectively, which comprise no harmful elements and exhibit an excellent infrared reflecting property and, therefore, are suitable as an infrared reflecting blue pigment and an infrared reflecting green pigment.

EXAMPLES

Typical examples of the present invention are described below. Meanwhile, in the following Examples and Comparative Examples, Examples 1 to 6 and Comparative Examples 1 to 4 relate to the infrared reflecting blue pigments, whereas Examples 7 to 13 and Comparative Examples 5 to 11 relate to the infrared reflecting green pigments.

The average particle diameter of the particles was expressed by an average value of particle diameters of 350 particles respectively observed and measured on a micrograph thereof.

The specific surface area was expressed by the value measured by a BET method.

The contents of respective metal elements in the infrared reflecting blue pigment and the infrared reflecting green pigment were measured by a fluorescent X-ray analyzer "3063M Model" (manufactured by RIGAKU DENKI KOGYO CO., LTD.) according to JIS K0119 "General rule of fluorescent X-ray analysis".

The amount of $Cr^{6+}$ was measured by an ICP emission spectrophotometer manufactured by SSI Nano-Technology Co., Ltd., according to JIS K0102, 65.2.4 "ICP emission spectral analysis".

The hues of each of the infrared reflecting blue pigment and the infrared reflecting green pigment were measured by the following method.

That is, 0.5 g of each sample and 0.5 mL of castor oil were intimately kneaded with each other by a Hoover's muller to obtain a paste. 4.5 g of clear lacquer was added to the obtained paste and was intimately kneaded to form a paint. The obtained paint was applied on a cast-coated paper by using a 150 μm (6-mil) applicator to produce a coating film piece (having a film thickness of about 30 μm). The hue of the coating film piece was measured using a Multi-Spectro-Colour-Meter "MSC-IS-2D" (manufactured by SUGA SHIKENKI CO., LTD.), and expressed by color specification indices ($L^*$, $a^*$ and $b^*$ values) according to JIS Z 8729.

The solar radiation characteristic of each of the infrared reflecting blue pigment and the infrared reflecting green pigment was determined as follows. That is, a reflectance value of the coating film piece used for the above hue measurement was measured by using a spectrophotometer "U-4100" manufactured by HITACHI HIGH-TECHNOLOGIES CO., LTD., and expressed by a solar radiation reflectance (%) at a wavelength of 300 to 2100 nm for the infrared reflecting blue pigment, and by a solar radiation reflectance (%) at a wavelength of 300 to 2100 nm for the infrared reflecting green pigment, according to JIS R3106-1998.

Example 1

CoO, MgO and $Al_2O_3$ were weighed, mixed with each other and then calcined in an electric furnace at 1050° C. for 2 hr to obtain a calcined product having a composition represented by the formula: $CoO_x \cdot MgO_{1-x} \cdot nAl_2O_3$ (wherein x=0.5; n=1). The resultant calcined product was pulverized, thereby obtaining a blue pigment having an average particle diameter of 0.2 μm and a BET specific surface area of 36 m²/g. It was confirmed that the thus obtained blue pigment had a spinel-type crystal structure.

The obtained blue pigment was subjected to lacquer color coating to prepare a color sample. The resulting color sample was measured using a spectrophotometer "U-4100" manufactured by Hitachi Limited to evaluate a reflectance thereof in a wavelength range of 250 to 2500 nm. As a result, it was confirmed that the reflectance of the sample in a wavelength range of 300 to 2100 nm was 50%.

Examples 2 and 3 and Comparative Examples 1 to 4

The same procedure as defined in Example 1 was conducted except that composition ratios of raw materials and calcining temperature were changed variously, thereby obtaining blue pigments.

The production conditions are shown in Table 1, and various properties of the obtained infrared reflecting blue pigments are shown in Table 2.

Example 4

The same procedure as defined in Example 1 was conducted to obtain a blue pigment. Next, the thus obtained blue pigment was wet-dispersed in water to obtain a slurry thereof. While dropping 0.5% by weight of a water glass to the slurry of the blue pigment maintained at 70° C., the pH value of the slurry was adjusted to 7 with hydrochloric acid and sodium hydroxide, and then the slurry was allowed to stand for one hour. Thereafter, the resulting slurry was subjected to water-washing, drying and pulverization treatments.

Examples 5 and 6

The same procedure as defined in Example 4 was conducted except that the conditions of surface treatment were changed variously, thereby obtaining blue pigments.

In the column "Crystal structure" of Table 2, "Spinel" means a spinel type crystal structure. Meanwhile, the $Cr^{6+}$ content of ">5 ppm (less than 5 ppm)" means that the content is below a detection limit of the measuring apparatus used.

TABLE 1

| Examples and Comparative Examples | Production of infrared reflecting blue pigment | | | |
|---|---|---|---|---|
| | Composition | Calcining temperature (° C.) | Surface treatment Kind | wt % |
| Example 1 | $Co_{0.5}Mg_{0.5}Al_{2.0}O_4$ | 1050 | None | 0 |
| Example 2 | $Co_{0.6}Mg_{0.4}Al_{2.0}O_4$ | 800 | None | 0 |
| Example 3 | $Co_{0.4}Mg_{0.6}Al_{2.0}O_4$ | 850 | None | 0 |
| Example 4 | $Co_{0.5}Mg_{0.5}Al_{2.0}O_4$ | 1050 | Si | 0.5 |
| Example 5 | $Co_{0.5}Mg_{0.5}Al_{2.0}O_4$ | 1050 | Zr | 0.5 |
| Example 6 | $Co_{0.5}Mg_{0.5}Al_{2.0}O_4$ | 1050 | Si | 0.5 |
| | | | Zr | 0.5 |
| Comparative Example 1 | $Co_{1.0}Al_{2.0}O_4$ | 1050 | None | 0 |
| Comparative Example 2 | $Co_{0.5}Mg_{0.5}Al_{2.0}O_4$ | 1250 | None | 0 |
| Comparative Example 3 | $Co_{0.3}Mg_{0.7}Al_{2.0}O_4$ | 1050 | None | 0 |
| Comparative Example 4 | $Co_{0.7}Mg_{0.3}Al_{2.0}O_4$ | 1050 | None | 0 |

TABLE 2

| Examples and Comparative Examples | Properties of infrared reflecting blue pigment Composition (molar ratio based on whole metal elements) | | |
|---|---|---|---|
| | Co | Mg | Al |
| Example 1 | 0.17 | 0.17 | 0.67 |
| Example 2 | 0.20 | 0.13 | 0.67 |
| Example 3 | 0.13 | 0.20 | 0.67 |
| Example 4 | 0.17 | 0.17 | 0.67 |

TABLE 2-continued

| Example 5 | 0.17 | 0.17 | 0.67 |
| Example 6 | 0.17 | 0.17 | 0.67 |
| Comparative Example 1 | 0.33 | — | 0.67 |
| Comparative Example 2 | 0.17 | 0.17 | 0.67 |
| Comparative Example 3 | 0.1 | 0.23 | 0.67 |
| Comparative Example 4 | 0.23 | 0.1 | 0.67 |

| Examples and Comparative Examples | Properties of infrared reflecting blue pigment | | | |
| --- | --- | --- | --- | --- |
| | Crystal structure | BET specific surface area ($m^2/g$) | Average particle diameter (μm) | $Cr^{6+}$ content (ppm) |
| Example 1 | Spinel | 36 | 0.2 | >5 ppm |
| Example 2 | Spinel | 80 | 0.03 | >5 ppm |
| Example 3 | Spinel | 65 | 0.05 | >5 ppm |
| Example 4 | Spinel | 37 | 0.2 | >5 ppm |
| Example 5 | Spinel | 37 | 0.2 | >5 ppm |
| Example 6 | Spinel | 37 | 0.2 | >5 ppm |
| Comparative Example 1 | Spinel | 35 | 0.3 | >5 ppm |
| Comparative Example 2 | Spinel | 8 | 1.4 | >5 ppm |
| Comparative Example 3 | Spinel | 31 | 0.3 | >5 ppm |
| Comparative Example 4 | Spinel | 30 | 0.4 | >5 ppm |

| Examples and Comparative Examples | Properties of infrared reflecting blue pigment; Hue | | | Properties of coating film; Solar radiation reflectance |
| --- | --- | --- | --- | --- |
| | Lightness (L*) | a* | b* | (%) |
| Example 1 | 43 | 18 | −53 | 50 |
| Example 2 | 48 | 25 | −55 | 57 |
| Example 3 | 45 | 20 | −50 | 55 |
| Example 4 | 42 | 18 | −52 | 51 |
| Example 5 | 43 | 17 | −54 | 51 |
| Example 6 | 45 | 18 | −52 | 51 |
| Comparative Example 1 | 35 | 24.9 | −60.6 | 40 |
| Comparative Example 2 | 33 | 15 | −54 | 40 |
| Comparative Example 3 | 54 | 19 | −57 | 51 |
| Comparative Example 4 | 38 | 16 | −45 | 44 |

Example 7

CoO, MgO, $Al_2O_3$ and $Fe_2O_3$ were weighed, mixed with each other and then calcined in an electric furnace at 1050° C. for hr to obtain a calcined product having a composition represented by the formula: $CoO_x \cdot MgO_{1-x} \cdot n[(Al_2O_3)_y \cdot (Fe_2O_3)_{1-y}]$ (wherein x=0.5; y=0.9; n=1). The resultant calcined product was pulverized, thereby obtaining a green pigment having an average particle diameter of 0.25 μm and a BET specific surface area of 20 $m^2/g$. It was confirmed that the thus obtained green pigment had a spinel-type crystal structure.

The obtained green pigment was subjected to lacquer color coating to prepare a color sample. The resulting color sample was measured using a spectrophotometer "U-4100" manufactured by Hitachi Limited to evaluate a reflectance thereof in a wavelength range of 250 to 2500 nm. As a result, it was confirmed that the reflectance of the sample in a wavelength range of 300 to 2100 nm was 44%.

Examples 8 to 9 and 13, and Comparative Examples 5 to 11

The same procedure as defined in Example 7 was conducted except that composition ratios of raw materials and calcining temperature were changed variously, thereby obtaining green pigments.

The production conditions are shown in Table 3, and various properties of the obtained infrared reflecting green pigments are shown in Table 4.

Example 10

The same procedure as defined in Example 7 was conducted to obtain a blue pigment. Next, the thus obtained green pigment was wet-dispersed in water to obtain a slurry thereof. While dropping 0.5% by weight of a water glass to the slurry of the green pigment maintained at 70° C. and, the pH value of the slurry was adjusted to 7 with hydrochloric acid and sodium hydroxide, and then the slurry was allowed to stand for one hour. Thereafter, the resulting slurry was subjected to water-washing, drying and pulverization treatments.

Examples 11 and 12

The same procedure as defined in Example 10 was conducted except that the conditions of surface treatment were changed variously, thereby obtaining green pigments.

In the column "Crystal structure" of Table 4, "Spinel" means a spinel type crystal structure. Meanwhile, the $Cr^{6+}$ content of ">5 ppm (less than 5 ppm)" means that the content is below a detection limit of the measuring apparatus used.

TABLE 3

| Examples and Comparative Examples | Production of infrared reflecting green pigment | | | |
| --- | --- | --- | --- | --- |
| | Composition | Calcining temperature (° C.) | Surface treatment Kind | wt % |
| Example 7 | $Co_{0.5}Mg_{0.5}Fe_{0.2}Al_{1.8}O_4$ | 1050 | None | 0 |
| Example 8 | $Co_{0.6}Mg_{0.4}Fe_{0.2}Al_{1.8}O_4$ | 800 | None | 0 |
| Example 9 | $Co_{0.4}Mg_{0.6}Fe_{0.2}Al_{1.8}O_4$ | 850 | None | 0 |
| Example 10 | $Co_{0.5}Mg_{0.5}Fe_{0.2}Al_{1.8}O_4$ | 1050 | Si | 0.5 |
| Example 11 | $Co_{0.5}Mg_{0.5}Fe_{0.2}Al_{1.8}O_4$ | 1050 | Zr | 0.5 |
| Example 12 | $Co_{0.5}Mg_{0.5}Fe_{0.2}Al_{1.8}O_4$ | 1050 | Si | 0.5 |
| | | | Zr | 0.5 |
| Example 13 | $Co_{0.5}Mg_{0.5}Fe_{0.02}Al_{1.98}O_4$ | 1150 | None | 0 |
| Comparative Example 5 | $Co_{1.0}Fe_{0.2}Al_{1.8}O_4$ | 1050 | None | 0 |
| Comparative Example 6 | $Co_{1.0}Fe_{0.2}Al_{1.8}O_4$ | 770 | None | 0 |
| Comparative Example 7 | $Co_{1.0}Fe_{0.2}Al_{1.8}O_4$ | 1230 | None | 0 |
| Comparative Example 8 | $Co_{0.3}Mg_{0.7}Fe_{0.2}Al_{1.8}O_4$ | 1050 | None | 0 |
| Comparative Example 9 | $Co_{0.7}Mg_{0.3}Fe_{0.2}Al_{1.8}O_4$ | 1050 | None | 0 |
| Comparative Example 10 | $Co_{0.5}Mg_{0.5}Fe_{0.01}Al_{1.99}O_4$ | 1050 | None | 0 |
| Comparative Example 11 | $Co_{0.5}Mg_{0.5}Fe_{0.8}Al_{1.2}O_4$ | 1050 | None | 0 |

TABLE 4

| Examples and Comparative Examples | Properties of infrared reflecting green pigment Composition (molar ratio based on whole metal elements) | | | |
|---|---|---|---|---|
| | Co | Mg | Fe | Al |
| Example 7 | 0.17 | 0.17 | 0.067 | 0.6 |
| Example 8 | 0.20 | 0.13 | 0.067 | 0.6 |
| Example 9 | 0.13 | 0.20 | 0.067 | 0.6 |
| Example 10 | 0.17 | 0.17 | 0.067 | 0.6 |
| Example 11 | 0.17 | 0.17 | 0.067 | 0.6 |
| Example 12 | 0.17 | 0.17 | 0.067 | 0.6 |
| Example 13 | 0.17 | 0.17 | 0.007 | 0.66 |
| Comparative Example 5 | 0.33 | — | 0.067 | 0.6 |
| Comparative Example 6 | 0.33 | — | 0.067 | 0.6 |
| Comparative Example 7 | 0.33 | — | 0.067 | 0.6 |
| Comparative Example 8 | 0.10 | 0.23 | 0.067 | 0.6 |
| Comparative Example 9 | 0.23 | 0.10 | 0.067 | 0.6 |
| Comparative Example 10 | 0.17 | 0.17 | 0.003 | 0.66 |
| Comparative Example 11 | 0.17 | 0.17 | 0.27 | 0.4 |

| Examples and Comparative Examples | Properties of infrared reflecting green pigment | | | |
|---|---|---|---|---|
| | Crystal structure | BET specific surface area ($m^2/g$) | Average particle diameter (μm) | $Cr^{6+}$ content (ppm) |
| Example 7 | Spinel | 20 | 0.25 | >5 ppm |
| Example 8 | Spinel | 75 | 0.02 | >5 ppm |
| Example 9 | Spinel | 62 | 0.04 | >5 ppm |
| Example 10 | Spinel | 21 | 0.3 | >5 ppm |
| Example 11 | Spinel | 22 | 0.3 | >5 ppm |
| Example 12 | Spinel | 23 | 0.3 | >5 ppm |
| Example 13 | Spinel | 8 | 0.7 | >5 ppm |
| Comparative Example 5 | Spinel | 15 | 0.35 | >5 ppm |
| Comparative Example 6 | Spinel | 89 | 0.02 | >5 ppm |
| Comparative Example 7 | Spinel | 4 | 1.3 | >5 ppm |
| Comparative Example 8 | Spinel | 22 | 0.2 | >5 ppm |
| Comparative Example 9 | Spinel | 18 | 0.2 | >5 ppm |
| Comparative Example 10 | Spinel | 34 | 0.15 | >5 ppm |
| Comparative Example 11 | Spinel | 17 | 0.35 | >5 ppm |

TABLE 4-continued

| Examples and Comparative Examples | Properties of infrared reflecting green pigment Hue | | | Properties of coating film; Solar radiation reflectance (%) |
|---|---|---|---|---|
| | Lightness (L*) | a* | b* | |
| Example 7 | 33.6 | −0.9 | −8.3 | 44 |
| Example 8 | 39 | −1 | −10 | 46 |
| Example 9 | 40 | −0.6 | −11 | 47 |
| Example 10 | 34 | −1 | −9 | 44 |
| Example 11 | 35 | −1 | −9 | 45 |
| Example 12 | 35 | −1 | −9 | 45 |
| Example 13 | 33 | −1.2 | −9 | 39 |
| Comparative Example 5 | 32 | −1.2 | −10 | 30 |
| Comparative Example 6 | 43 | −1 | −10 | 43 |
| Comparative Example 7 | 32 | −1 | −9 | 35 |
| Comparative Example 8 | 42 | −2 | −12 | 32 |
| Comparative Example 9 | 31 | −1 | −8 | 33 |
| Comparative Example 10 | 41 | −1 | −9 | 45 |
| Comparative Example 11 | 30 | 1 | 2 | 30 |

What is claimed is:

1. An infrared reflecting blue pigment comprising a composite oxide comprising Co, Al and Mg, wherein a total molar ratio of Co and Mg to total molar content of Al is 1:2, a content of Mg in the blue pigment is 11 to 22% in terms of a molar ratio thereof based on whole metal element present in the blue pigment, the blue pigment has a BET specific surface area of 10 to 100 $m^2/g$, the infrared reflecting blue pigment has a solar radiation reflectance of 45 to 60% and a lightness (L*) of 35 to 50.

2. An infrared reflecting blue pigment according to claim 1, wherein the infrared reflecting blue pigment has a spinel-type crystal structure.

3. An infrared reflecting blue pigment according to claim 1, wherein a surface of the infrared reflecting blue pigment is coated with a compound of at least one element selected from the group consisting of Si, Al, Zr and Ti.

4. A paint comprising the infrared reflecting blue pigment as defined in claim 1, and a paint base material in which the pigment is blended.

5. A resin composition comprising the infrared reflecting blue pigment as defined in claim 1 with which the composition is tinted.

6. An infrared reflecting blue pigment according to claim 1, wherein a* value of the infrared reflecting blue pigment is 15 to 30.

7. An infrared reflecting blue pigment according to claim 1, wherein the b* value of the infrared reflecting blue pigment is −40 to −60.

8. An infrared reflecting blue pigment according to claim 1, having an average particle diameter of 0.02 to 1.2 μm.

* * * * *